United States Patent [19]

Lorenzana

[11] Patent Number: 5,207,182

[45] Date of Patent: May 4, 1993

[54] ANIMAL WATERING APPARATUS

[76] Inventor: Moises B. Lorenzana, 601 Lake Hinsdale Dr., Willowbrook, Ill. 60514

[21] Appl. No.: 905,674

[22] Filed: Jun. 29, 1992

[51] Int. Cl.$^5$ ................................. A01K 7/00
[52] U.S. Cl. .................... 119/77; D30/122; 119/75
[58] Field of Search ............... 119/75, 77, 51.5, 51.12, 119/52.1, 54, 53.5; 43/131, 132.1; D30/121, 122, 129, 132

[56] References Cited

U.S. PATENT DOCUMENTS

| D. 289,808 | 5/1987 | Gardner | D30/13 |
|---|---|---|---|
| D. 294,750 | 3/1988 | Atchley | D30/132 |
| D. 296,371 | 6/1988 | Lorenzana | D30/122 |
| D. 300,277 | 3/1989 | Clark | D30/122 |
| 919,482 | 4/1909 | Smith et al. | 119/75 |
| 3,720,184 | 3/1973 | Pearce | 119/51.5 |
| 3,870,022 | 3/1975 | Hart | 119/75 |
| 4,034,715 | 7/1977 | Arner | 119/51.5 |
| 4,134,365 | 6/1979 | Futers et al. | 119/51.5 |
| 4,573,434 | 3/1986 | Gardner | 119/77 |

Primary Examiner—Gene Mancene
Assistant Examiner—T. Price
Attorney, Agent, or Firm—Neil M. Rose

[57] ABSTRACT

Animal watering apparatus providing a central water receiving portion which is surrounded by a funnel-shaped portion designed to return splashed water back to the central portion. Water is supplied to the central portion by an inverted reservoir bottle which maintains the central portion filled with water at a level below the funnel-shaped portion.

20 Claims, 2 Drawing Sheets

ANIMAL WATERING APPARATUS

BACKGROUND OF THE INVENTION

1. Field of the Invention:

The present invention relates generally to animal watering dishes and more particularly to apparatus for continuously supplying water to an animal drinking receptacle.

2. Description of the Prior Art:

As a consequence of the large numbers of domestic animals or pets being maintained in homes throughout the world, there is a substantial demand for equipment which facilitates the care and feeding of such animals. While many pet owners may provide food and water for their pets in bowls used for conventional cooking or serving of food for humans, most pet owners ultimately acquire food and water bowls or receptacles which are particularly adapted to the needs of their pets. These bowls or receptacles are usually break-resistant, being made of plastic so as to withstand the rough usage to which they are subjected. In addition, the bowls or receptacles are shaped to have a broad base to increase the stability and lessen the possibility of the animal or pet tipping the bowl or receptacle when eating or drinking.

It is important for an animal or pet watering bowl to have sufficient capacity to satisfy the requirements during the period of the owners absence. This period may be in excess of ten hours while the owner is away during the day at work. It is also important that the watering bowl be designed to minimize the spillage of water by the animal or pet when drinking from the bowl.

There are many examples in the prior art of animal watering apparatus which utilized inverted bottles to supply water to an open receptacle from which an animal may drink. The inverted bottle serves as a reservoir to increase the overall water capacity of the apparatus so that the apparatus may supply the needs of an animal over a longer period of time than could the conventional dish or receptacle. Such apparatus typically makes use of the two liter bottles in which carbonated beverages are typically sold.

One example of such prior art watering apparatus is disclosed in the U.S. Design Pat. No. D-296,371 to Lorenzana, et al. Other prior art patents disclosing watering apparatus including supply reservoirs separate from a drinking receptacle are U.S. Pat. No. 4,573,434 to Gardner; U.S. Pat. No. 4,134,365 to Futers, et al.; and U.S. Design Patents No. D-289,808 to Gardner, U.S. Pat. No. D-294,750 to Atchley; and U.S. Pat. No. D-300,277 to Clark.

The prior art animal watering apparatus which employ such inverted bottles as supplementary water reservoirs are well accepted as a means of increasing the water capacity of the watering apparatus and of increasing the time over which the apparatus can satisfy the needs of a pet or animal. However, there are problems in using any known watering apparatus for large dogs or other large animals. When such animals drink from a shallow water receptacle, they have a tendency to splash the water out of the receptacle onto the adjacent floor area. In addition, when such animal interrupts or ceases drinking from such receptacles, the animal tends to drip or drool large amounts of water outside of the receptacle onto the adjacent floor area. As a consequence, much of the water is wasted and is not effective in satisfying the needs of the animal. This condition decreases the effective capacity of the apparatus.

In the past, the problem presented by the large dog was attempted to be solved by merely providing a larger bowl. However, the larger bowl often results in more splashing outside of the receptacle with more wasting of water and staining of the floor area around the watering apparatus. Regardless of the size of a bowl or receptacle, most animals, particularly dogs, tend to drink the water adjacent the side wall of the bowl, causing the splashing out of the bowl onto the floor. Accordingly, it would be desirable to provide a watering apparatus for use by large animals which would minimize water loss or spillage caused by the animal splashing during and after drinking.

SUMMARY OF THE INVENTION

The animal watering apparatus of the present invention utilizes at least one inverted detachable bottle as a reservoir to supply water to a receptacle adapted to provide drinking water for an animal or pet. The receptacle is formed with a cup-shaped inner or central portion into which water is conducted from the bottle with the mouth of the bottle positioned to maintain a constant water level within this central portion. A second portion of the receptacle is funnel-shaped and extends outwardly from the periphery of the upper edge of the cup-shaped portion. The funnel-shaped portion functions to drain water back into the central cup-shaped portion when it is splashed outwardly by a drinking animal. In addition, most animals have a tendency to drip or drool after drinking, and the funnel-shaped portion of the receptacle catches any such dripping or drooling and returns it to the central cup-shaped portion.

The detachable bottle is supported in an upwardly facing recess in the funnel-shaped portion with a passageway extending from the recess to the cup-shaped portion to permit water flow from the recess to the cup-shaped portion. The mouth of the detachable bottle is positioned in the recess at a level so that water level within the cup-shaped portion will substantially fill the cup-shaped portion. The funnel-shaped portion of the receptacle has the walls sloping at about 25 degrees to the horizontal so that the outer rim of the funnel-shaped portion is relatively low in height and forms no obstruction to the drinking animal having access to the cup-shaped central portion.

Outwardly of the funnel-shaped portion of the receptacle, there is provided a downwardly extending peripheral outer wall which serves to support the receptacle on a horizontal surface. The peripheral wall is substantially cylindrical but is angled slightly to facilitate plastic molding of the apparatus and to permit stacking of the receptacles. At the lower edge of the outer peripheral wall, there are cutouts on diametrically opposite edges to provide handles for gripping the apparatus when lifting it from the horizontal surface.

One preferred embodiment includes recesses for supporting two of the conventional 2-liter plastic soft drink bottles. This total capacity of four liters provides ample water to satisfy the needs of most domestic animals for a substantial period of time, as for instance, during the day or for short vacations while the owner is absent. The weight of the water in the detachable bottles stabilizes the apparatus and reduces the possibility of the animal accidentally upsetting the receptacle.

The receptacle is preferably a one-piece plastic molded part designed so that it may be nested with other such parts for storage and shipping. In order to prevent jamming or locking of such parts when they are stacked, a plurality of radially extending peripherally disposed ribs or walls are provided which extend between the inside of the upper portions of the peripheral outer wall and the underside of the funnel-shaped portion of the receptacle. These ribs or walls limit the amount of nesting possible and prevent the locking between the cylindrical or conical wall portions of the stacked receptacles.

Accordingly, it is an object of the present invention to provide an improved animal watering apparatus having a water receptacle with means for preventing splashing from the apparatus.

It is another object of the present invention to provide an improved animal watering apparatus having detachable water bottle reservoir means supplying water to a receptacle having a central cup-shaped portion to be filled with water from said reservoir means and having a funnel-shaped portion to receive splashed water from the central cup-shaped portion and to direct such splashed water back into the cup-shaped portion.

BRIEF DESCRIPTION OF THE DRAWINGS

While the present invention is described with particularity in the claims annexed to and forming a part of this specification, a better understanding of the invention can be had by reference to the following description taken in conjunction with the accompanying drawings in which:

DESCRIPTION OF THE PREFERRED EMBODIMENT.

Figure 1:
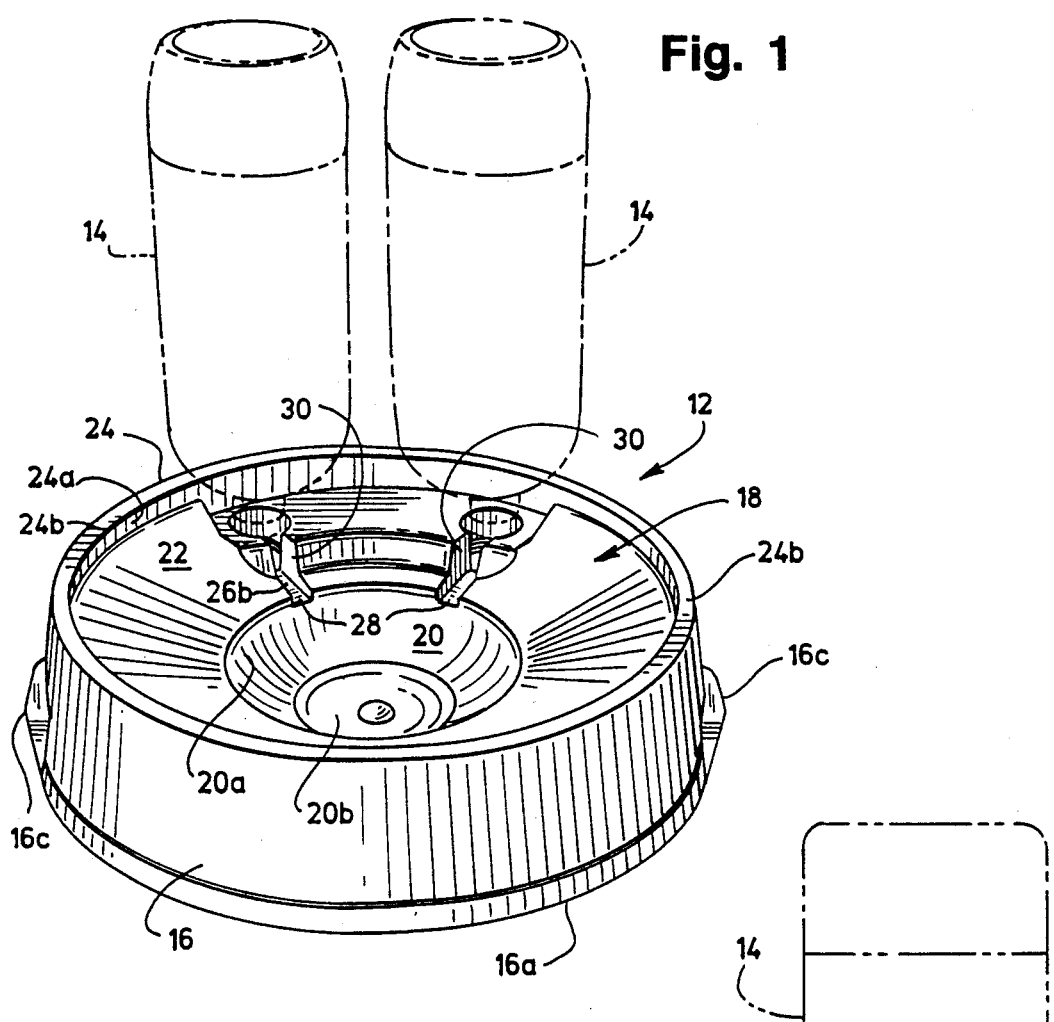
FIG. 1 is a front perspective view from above of the animal watering apparatus of the present invention with detachable reservoir bottles shown in dashed lines.
Figure 3:
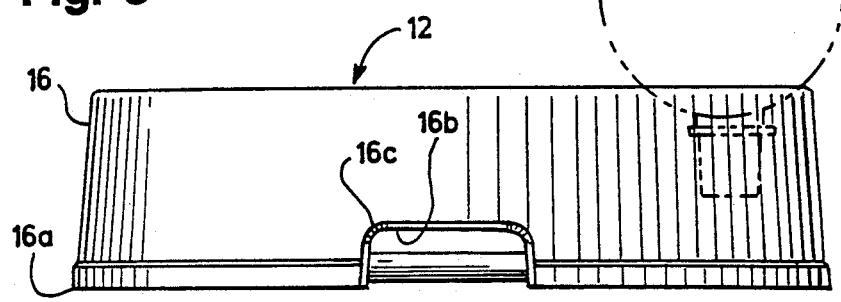
FIG. 3 is a right side elevational view of the watering apparatus of FIG. 1.
Figure 2:
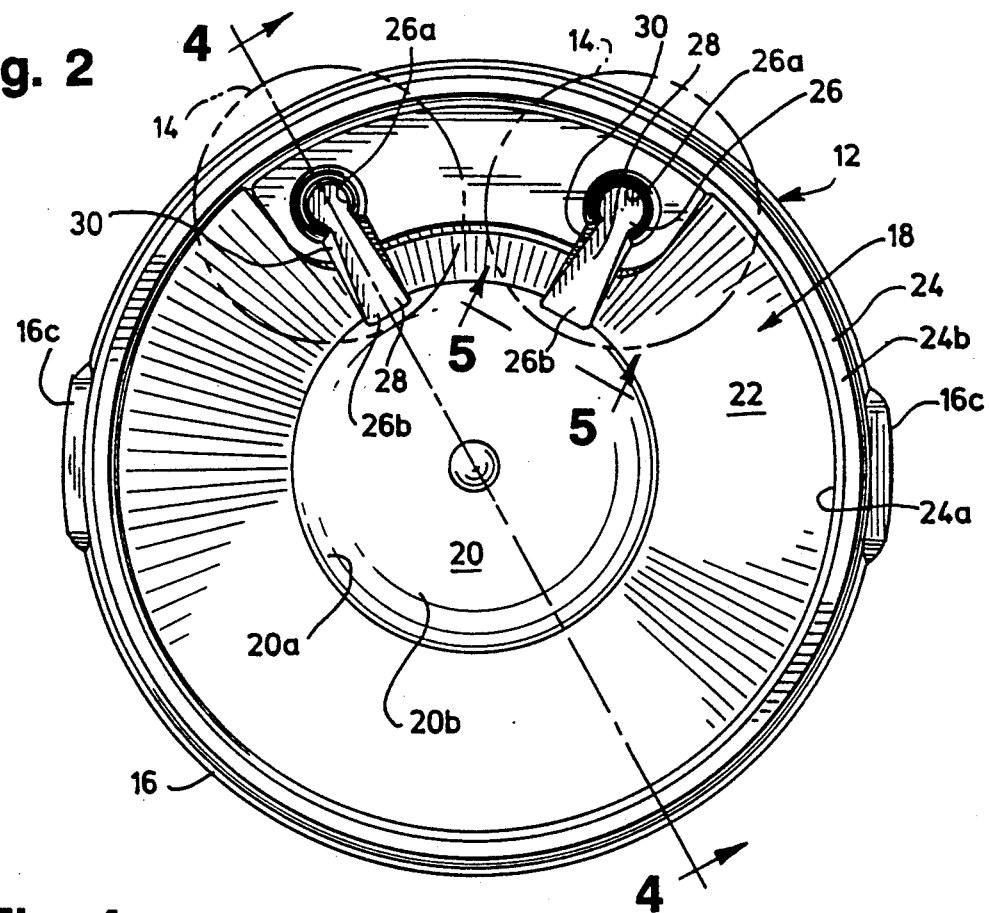
FIG. 2 is a top plan view of the watering apparatus of FIG. 1.

Referring to the drawings, there is shown in FIG. 1 animal watering apparatus designated generally by reference numeral 12. The apparatus 12 is provided with means for supporting reservoir bottles 14 in an inverted position so that they may supply water to the apparatus 12. The bottles 14 are preferably conventional 2-liter plastic bottles in which carbonated soft drinks are sold and which are readily available for use with the apparatus 12.

The apparatus 12 is supported by an upstanding peripheral outer wall 16 which is generally cylindrical but is tapered inwardly at an angle of on the order of 5 degrees to facilitate molding and stacking of the apparatus 12 for storage or shipping. The peripheral wall 16 terminates in a circular edge 16a which is adapted to engage a horizontal surface such as a floor. The wall 16 is provided with handle openings 16b at two diametrically opposed locations along the edge 16a. Adjacent the openings 16b there are formed handles 16c which extend horizontally from the edges of the openings 16b and permit the apparatus 12 to be lifted from the floor when desired.

Located within the peripheral wall 16 is an upwardly opening receptacle 18 which includes a central cup-shaped portion 20 and a funnel-shaped portion 22. The cup-shaped portion 20 is formed by a cylindrical wall 20a and a generally circular flat bottom wall 20b. The water bottles 14 are positioned to maintain a constant level of water within the cup-shaped portion 20 so that it is substantially filled to the top of the wall 20a.

The funnel-shaped portion 22 extends outwardly from the upper edge of the cup-shaped portion 20 connecting at its peripheral edge with the peripheral outer wall 16. There is provided a lip 24 having a cylindrical wall portion 24a and an annular wall 24b positioned between the funnel-shaped portion 22 and the outer peripheral wall 16. The funnel-shaped portion 22 and the lip 24 tend to trap or catch any splashing water or dripping water and redirect it back into the central portion 20.

It has always been a problem with large dogs and animals to prevent their splashing water from their watering apparatus. Also, other smaller dogs have a tendency to drip or drool after drinking which causes floor or rug staining deposits around the watering apparatus. The apparatus 12 of the present invention substantially eliminates such problems by providing means for maintaining the water in the central cup-shaped portion and utilizing the funnel-shaped portion for collecting and returning any splashed or dripped water back to the central cup-shaped portion.

One of the causes of water being splashed out of a pet watering bowl is the fact that most animals or pets tend to drink from the water at the edge of the bowl rather than drinking from the middle of the bowl. As a consequence, the normal action of the animal's tongue tends to splash the water outside of the bowl where it stains the floor or carpet. In the apparatus 12 of the present invention, the edge of the water from which the animal must drink is at the edge of the cup-shaped portion 20 which is located inside of the funnel-shaped portion 22. Thus, substantially all of the water splashed by the animal will fall within the area encompassed by the lip 24 and be channeled back into the central portion 20.

For the purpose of supporting each of the reservoir bottles 14 there is provided in the funnel-shaped portion 22 a recess 26 having a threaded portion 26a adapted to receive the neck of the bottle 14. Thus, the bottle 14 may be inverted and the neck inserted into the recess 26. The bottle is then rotated until the threads on the bottle are securely engaged with the threads 26a, thereby securing the bottle to the apparatus 12 in its inverted position so that the contents of the bottle will drain into the recess 26.

At the lower end of the recess 26, there is provided a wall 26b which extends laterally toward the cupshaped portion 20 and which defines the lower wall of a passageway 28 for delivering water from the recess 26 to the cup-shaped portion 20. The passageway 28 includes generally vertically disposed sidewalls 30 which combine with the wall 26b to define an upwardly facing slot or channel which extends through the funnel-shaped portion 22 and the wall 20a of the cup-shaped portion 20. The passageway 28 provides the means for water to flow from the recess 26 into the cup-shaped portion 20 of the apparatus 12.

When the water filled bottles 14 are assembled to the apparatus 12 by threaded engagement of their neck portions into the threads 26a, the water in the bottles 14 flows into the recesses 26 and through the passageways 28 into the cup-shaped portion 20. The mouths of the bottles 14 are disposed substantially level with the top of cylindrical wall 20a of the cup-shaped portion 20 so that the water continues to flow from the bottles 14 until the cup-shaped portion 20 is filled. At that time, the water level in the apparatus 12 prevents further air from entering the bottles 14 and prevents further water flow from the bottles 14. As water is consumed from the cup-shaped central portion 20, additional water will flow from the bottles 14 to maintain the level of water substantially filling the portion 20. With the water at this level, the funnel-shaped portion 22 is above the level of the water causing the drinking pet or animal to be restricted to drinking from the central portion 20. Any splashing by the drinking animal will be from the central portion 20, leaving the funnel-shaped portion 22 and the lip 24 to catch or deflect the splashed water back into the central portion 20. Similarly, any saliva or water dripping from the animal's mouth will usually be close enough to the central portion 20 so that it is caught by the funnel-shaped portion 22 and drained into the central portion 20.

In a constructed embodiment of the apparatus 12 intended for use by large dogs, the outside diameter of the funnel-shaped portion 22 was about 12", the diameter of the cup-shaped central portion 20 was about 6", the depth of the central portion was about 1½" and the depth of the funnel-shaped portion 22 from the lip 24 to the water level in the central portion 20 was about 1⅛". This size apparatus 12 allowed a large dog to have easy and convenient access to the water in the central portion 20 while providing a sufficiently large funnel-shaped portion 22 to catch any splashed or dripped water and deflect it back into the central portion 20 of apparatus 12. It should be understood that size of the apparatus 12 may be adapted to the particular size of the animal or pet with which it might be intended to be used. The dimensions given above were found to be suitable in designing the apparatus 12 for use by typical large domestic dogs. The apparatus 12 substantially eliminates the problems of large dogs splashing water from their water bowls. In addition, the use of the reservoir bottles 14 increases the stability of the apparatus 12 and provides a substantial volume of water to be delivered to the drinking area, the central portion 20, over a period of time. The bottles 14 weigh on the order of ten pounds when filled with water. This weight provides added stability for the apparatus 12 and prevents the apparatus from sliding or tipping.

Although the receptacle 18 has been disclosed as having a cylindrical wall 20a in the central portion 20 and a conical section forming the funnel-shaped portion 22, it should be understood that the central portion 20 could be square or rectangular in plan view and the funnel-shaped portion could be of a pyramidal section. The only requirement of the funnel-shaped portion is that it extend outwardly and upwardly from the central portion and that it drain splashed water back to the central portion.

Figure 4:
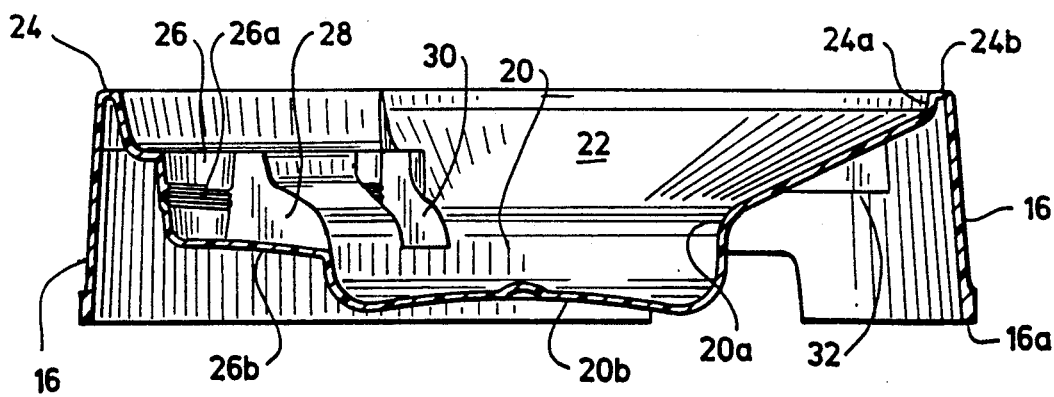
FIG. 4 is an enlarged sectional view taken on line 4—4 of FIG. 2.
Figure 5:
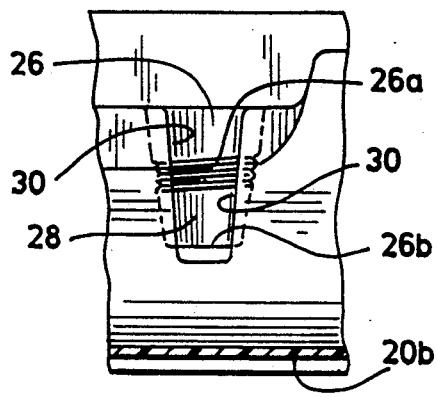
FIG. 5 is an enlarged fragmentary sectional view taken on line 5—5 of FIG. 2.

The configuration of the apparatus 12 is such that it may be readily molded of plastic in a single piece and is, therefore, inexpensive to fabricate. A durable polypropylene is a suitable material from which to mold the apparatus 12. As indicated above, the peripheral wall 16 is angled slightly to facilitate molding and to permit nesting of the molded products for shipping or storage. In order to limit the amount of nesting under such shipping or storage conditions, a plurality of radially extending ribs 32 are provided between the funnel-shaped portion 22 and the peripheral wall 16, one such wall 32 being shown in FIG. 4. There are six such ribs or walls 32 equally spaced around the periphery of the apparatus 12. The walls 32 are positioned to engage the lip 24 of an adjacent stacked and nested product to prevent the peripheral walls 16 from jamming together in such nested relationship. Thus, the apparatus 12 may be nested in storage and by limiting the nesting by the walls 32, they may be readily separated when desired.

The animal watering apparatus provides a unique means of satisfying the needs of domestic pets for water over a substantial period of time while minimizing the damage to the household environment by substantially eliminating any splashing or dripping of water by the pet while drinking. By redirecting the splashed or dripped water back into the portion of the apparatus from which the pet drinks, there is no wastage of water. In addition, the reservoir bottles provide increased stability for the apparatus 12 so that the pet is less likely to upset the receptacle or to slide it around on the floor.

What is claimed as new and desired to be secured by Letters Patent of the United States is:

1. An animal watering apparatus comprising an open topped receptacle from which an animal may drink liquid, said receptacle being supported by an upstanding peripheral outer wall which is formed with a lower edge for engagement with a supporting surface, said receptacle being connected at its periphery to an upper edge of said outer wall, said receptacle having a first portion which is cup-shaped and disposed inwardly and downwardly from said upper edge of said outer wall, said receptacle having a second portion which is funnel-shaped and extends downwardly between said upper edge of said outer wall and said first portion to drain liquid into said cup-shaped first portion, said receptacle being formed with at least one recess which detachably receives the mouth of a first reservoir bottle which is mounted in an inverted position to supply liquid to said receptacle, said first reservoir bottle being supported with the mouth level with lowermost extension of said funnel-shaped second portion of said receptacle, a passageway extending between said recess and said first portion of said receptacle to transfer liquid from said recess to said receptacle.

2. The animal watering apparatus in accordance with claim 1 wherein said cup-shaped first portion of said receptacle includes an upper edge which is connected to the lowermost extension of said funnel-shaped second portion, said recess being formed in said funnel-shaped second portion and opening upwardly to receive the mouth of said reservoir bottle disposed vertically on said receptacle.

3. The animal watering apparatus of claim 2 including a second recess formed in said receptacle which detachably receives the mouth of a second reservoir bottle mounted in an inverted position horizontally spaced from said first reservoir bottle, and a second passageway extending between said second recess and said first portion of said receptacle to transfer liquid from said second recess to said receptacle.

4. The animal watering apparatus of claim 1 wherein said second portion of said receptacle supports said first portion below and inwardly from said upper edge of said outer wall to prevent water splashing from the first portion by a drinking animal from falling outside of said peripheral outer wall.

5. The animal watering apparatus of claim 4 wherein said funnel-shaped second portion is formed by a conical wall section angled at between 20 and 70 degrees to the horizontal to funnel splashed water back into said first portion of said receptacle.

6. The animal watering apparatus of claim 5 wherein said peripheral outer wall and said cup-shaped first portion are generally cylindrical and coaxial, said cup-shaped first portion being on the order of one-half the diameter of said outer peripheral wall of said receptacle.

7. The animal watering apparatus of claim 6 wherein said conical wall section is angled at about 25 degrees to the horizontal.

8. The animal watering apparatus of claim 1 wherein said outer peripheral wall is formed with a pair of oppositely disposed openings at said lower edge to form finger openings for handling said receptacle.

9. The animal watering apparatus of claim 1 wherein said outer peripheral wall and said cup-shaped first portion are generally cylindrical and coaxial, said outer peripheral wall being angled inwardly to permit vertical stacking of said apparatus with said open topped receptacles being nested one within another, a plurality of radially extending peripherally disposed walls between said outer wall and said funnel-shaped second portion to limit the nesting of said apparatus when stacked.

10. Animal watering apparatus for preventing splashing outside of the apparatus by a drinking animal comprising:
   an open receptacle having a cup-shaped first portion from which an animal may drink water, said cup-shaped first portion being surrounded by a funnel-shaped second portion which extends upwardly and outwardly from an upper circular edge of said first portion,
   water supply means for continuously supplying water to said first portion to maintain said first portion filled with water to a constant level which level is below said funnel-shaped second portion,
   said funnel-shaped second portion receiving water splashed by a drinking animal and draining such splashed water back into said first portion of said receptacle.

11. An animal watering apparatus as set forth in claim 10 wherein said water supply means is supported by said second portion of said receptacle, support means for said receptacle extending downwardly from said second portion to engage a horizontal surface, said support means engaging said horizontal surface outwardly of said second portion.

12. An animal watering apparatus in accordance with claim 10 wherein said receptacle is supported by a generally cylindrical outer peripheral wall surrounding said first and second portions and having an upper edge connected to said second portion, said second portion having a truncated conical shaped wall with an upper circular edge connected to the upper edge of said outer peripheral wall.

13. An animal watering apparatus in accordance with claim 12 wherein said funnel-shaped second portion is formed with a vertically extending annular wall adjacent said upper circular edge to deflect water splashed from said first portion inwardly and downwardly.

14. An animal watering apparatus in accordance with claim 12 wherein said generally cylindrical outer peripheral wall is formed with a circular lower edge for engagement with a horizontal supporting surface, said lower edge being formed with diametrically disposed cutouts to provide handles for removing said apparatus from a horizontal surface.

15. An animal watering apparatus for preventing splashing outside of the apparatus by a drinking animal comprising:
   an open receptacle having a cup-shaped first portion from which an animal may drink water, said cup-shaped first portion being surrounded by a funnel-shaped second portion which extends upwardly and outwardly from an upper circular edge of said first portion,
   water supply means for continuously supplying water to said first portion to maintain said first portion filled with water to a constant level, said water supply means being supported by said second portion of said receptacle,
   said funnel-shaped second portion receiving water splashed by a drinking animal and draining such splashed water back into said first portion of said receptacle,
   support means for said receptacle extending downwardly from said second portion to engage a horizontal surface, said support means engaging said horizontal surface outwardly of said second portion;
   said funnel-shaped second portion being formed with a first upwardly facing recess detachably receiving a water bottle in an inverted position with a mouth opening of said bottle received in said recess, a horizontal passageway extending between said recess and said cup-shaped first portion so that said bottle supplies water to said first portion and maintains a constant water level therein.

16. An animal watering apparatus as set forth in claim 15 including a second recess formed in said funnel-shaped second portion for receiving a second water bottle supplying water to said cup-shaped first portion, said first and second recesses being peripherally spaced with respect to said first cup-shaped portion and being spaced outwardly an equal distance from said first portion.

17. An animal watering apparatus as set forth in claim 16 wherein the center of gravity of said water bottles is located inwardly of said support means to stabilize said apparatus against upward displacement.

18. An animal watering apparatus for preventing splashing outside of the apparatus by a drinking animal comprising:
   an open receptacle having a cup-shaped first portion from which an animal may drink water, said cup-shaped first portion being surrounded by a funnel-shaped second portion which extends upwardly and outwardly from an upper circular edge of said first portion, water supply means for continuously supplying water to said first portion to maintain said first portion filled with water to a constant level,
   said funnel-shaped second portion receiving water splashed by a drinking animal and draining such splashed water back into said first portion of said receptacle,
   said receptacle being supported by a generally cylindrical outer peripheral wall surrounding said first and second portions and having an upper edge connected to said second portion, said second portion having a truncated conical shaped wall with an upper circular edge connected to the upper edge of said outer peripheral wall, said funnel-shaped second portion being formed with a vertically extending annular wall adjacent said upper circular edge to deflect water splashed from said first portion inwardly and downwardly, said funnel-shaped second portion being formed with a pair of upwardly facing recesses for detachably mounting water bottles in an inverted position, each bottle having an opening formed in a threaded neck portion which is threadedly received in one of said recesses, passageways formed in said receptacle connecting said recesses with said cup-shaped first portion to supply water from said bottles to said first portion and maintain a constant level therein.

19. Apparatus for supplying drinking water for animals comprising:

an open receptacle having a cup-shaped first portion for receiving water which may be consumed by an animal and having a funnel-shaped second portion extending outwardly and upwardly from said cup-shaped first portion to receive water splashed by an animal drinking from said first portion and drain such splashed water back into said first portion of said receptacle, and water supply means for continuously supplying water to said first portion to maintain said first portion filled with water to a constant level which level is below said second portion.

20. Apparatus for supplying drinking water for animals in accordance with claim 19 including a support wall surrounding said receptacle to support said receptacle on a horizontal surface.

* * * * *